United States Patent [19]
Kelkar et al.

[11] Patent Number: 6,107,958
[45] Date of Patent: Aug. 22, 2000

[54] METHOD AND APPARATUS FOR TESTING AN ANTENNA CONTROL SYSTEM

[75] Inventors: Anand Kelkar; Luc Gravelle, both of Calabasas, Calif.

[73] Assignee: Malibu Research Associates, Inc., Calabasas, Calif.

[21] Appl. No.: 09/181,366

[22] Filed: Oct. 28, 1998

[51] Int. Cl.[7] .................................................. G01S 7/40
[52] U.S. Cl. .................. 342/169; 342/73; 342/74; 342/75; 342/165; 342/170; 342/173; 342/195
[58] Field of Search ........................ 342/73–81, 165, 342/169, 170, 173, 174, 175, 195

[56] References Cited

U.S. PATENT DOCUMENTS

| | | |
|---|---|---|
| 3,683,381 | 8/1972 | Strenglein . |
| 3,982,244 | 9/1976 | Ward et al. . |
| 4,003,055 | 1/1977 | Eriksson et al. . |
| 4,591,858 | 5/1986 | Jacobson . |
| 4,969,819 | 11/1990 | James . |
| 5,117,230 | 5/1992 | Wedel, Jr. . |
| 5,283,585 | 2/1994 | Kneale . |
| 5,303,878 | 4/1994 | McWilliams et al. . |
| 5,581,258 | 12/1996 | Arico .................................. 342/165 |

*Primary Examiner*—Bernarr E. Gregory
*Attorney, Agent, or Firm*—Hoffmann & Baron, LLP

[57] ABSTRACT

A method and apparatus for testing an antenna control system. The antenna control system having an antenna control unit electrically coupled to an antenna pedestal. The present invention simulates the operational environment of the antenna control system and records the systems responses to the simulation. The responses are then analyzed and the antenna control system is adjusted to correct errors.

13 Claims, 12 Drawing Sheets

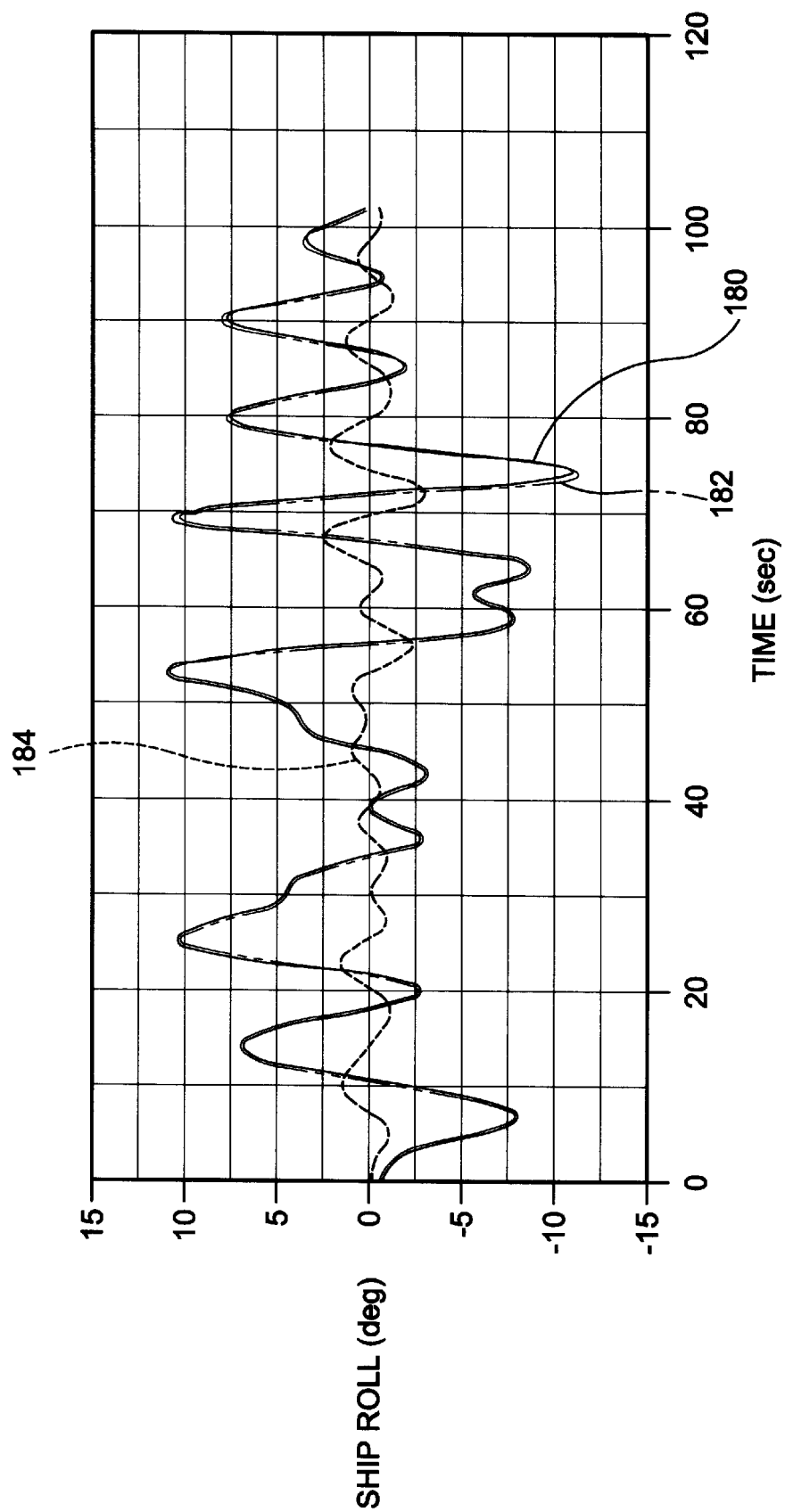
FIG. 11   PEDESTAL RESPONSE (sloppy loop)
SIMULATED SEA STATE 5 (DDG class ship)

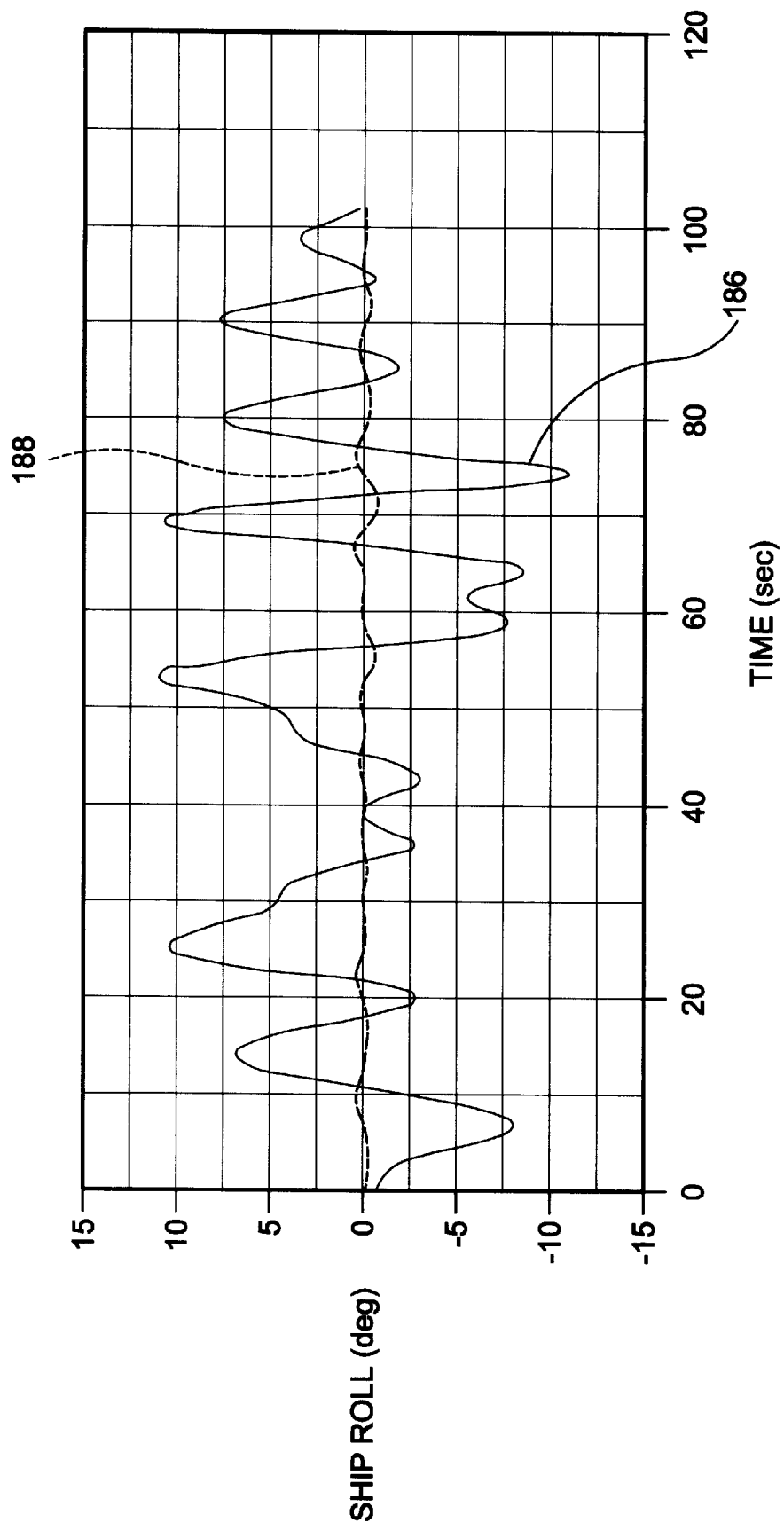
FIG. 12 PEDESTAL RESPONSE (modified loop)
SIMULATED SEA STATE 5 (DDG class ship)

METHOD AND APPARATUS FOR TESTING AN ANTENNA CONTROL SYSTEM

BACKGROUND OF THE INVENTION

1. Field of the Invention

The present invention relates to the field of antenna control system testing and, more particularly, to systems in which a simulated target or simulated antenna pattern is employed to test the responses of an antenna control unit.

2. Description of the Prior Art

As computers play a more influential role in the control of tracking telemetry antenna systems, the capabilities of these antenna systems becomes more sophisticated. Testing and characterizing these features is very difficult since a cooperative target carrying sophisticated electronics is required to set up the special conditions that these advanced capabilities are meant to handle. At present, there is no known way to fully and reliably test these tracking control features without the use of expensive, fast maneuvering airborne or seaborne test platforms.

Prior to the present invention, antenna control systems required field tests including the use of transmitters, antennas, and receivers. Radio frequency (RF) signals would be generated by the target's transmitter and then transmitted to the antenna. The receiver would then process the signal and communicate all relevant information to an antenna control unit (ACU). Once provided with the necessary information, the antenna control unit would generate the proper control functions to continue tracking the target. This process was burdensome and required considerable expense. These tests were even more burdensome and expensive when using multiple targets.

Moreover, the antenna control system could not be readily tested for identical target telemetries under differing weather conditions or varied signal effects (e.g., fading or multi-path) because the target's path could not easily be duplicated. Multi-path is caused by reflections of target echoes from other objects or surfaces causing echo energy to arrive at the antenna by other than the direct return path. Fading occurs when the signal attenuates to a point where it is difficult to detect for a variety of reasons.

The broad concept of a simulator used for testing is disclosed in U.S. Pat. No. 4,969,819 to James. The '819 patent is directed to an electronic counter measures simulator for radar system vulnerability studies. The simulator disclosed in the '819 patent employs RF signal generators to create simulated target return signals which include the effects of propagation factors as well as electronic counter measure simulation. The RF signal is then transmitted to the radar system under test and the signal is subsequently processed.

The '819 patent is directed solely to the testing of radar systems and does not overcome many of the disadvantages earlier described.

Another simulation system is disclosed in U.S. Pat. No. 3,982,244 to Ward et al. The '244 patent is also directed to the testing of radar systems and discloses the use of multiple simulators to generate an intermediate frequency signal containing target data. These signals provide data to the radar system which is representative of known target return signals, clutter, electronic counter measure, and other pertinent noise signals. This data is then processed and radar system control functions are produced.

The '244 patent is also directed solely to the testing of radar systems and does not overcome the problems associated with testing complex and sophisticated telemetry antenna control systems.

OBJECTS AND SUMMARY OF THE INVENTION

It is an object of this invention to create a virtual environment in which telemetry antenna control systems can be tested.

It is a further object of this invention to provide a virtual environment in which telemetry antenna control systems can be characterized according to the units ability to track a target in a variety of situations.

It is an object of this invention to create a virtual environment in which telemetry antenna control systems can be tested and characterized over a long period of time with the same simulations to track system performance and create a performance history.

It is an object of this invention to create a virtual environment in which telemetry antenna control systems can be tested and characterized during production to ensure that all systems meet or exceed specific criteria and parameters.

It is a further object of this invention to provide a portable unit which can create a virtual environment for testing and characterizing telemetry antenna control systems in the field.

It is a further object of this invention to provide a method in which the capabilities of telemetry antenna control systems can be exhaustively tested without requiring multiple targets following difficult trajectories in differing conditions.

These and other objects, features, and advantages of the present invention will be apparent from the following detailed description of illustrative embodiments thereof, which are to be read in connection with the accompanying drawings.

The present invention comprises an apparatus and a method for creating a virtual environment in which a telemetry antenna control system can be tested and characterized. The antenna control system includes an antenna control unit electrically coupled to a pedestal and a feed positioned at a focal point of an antenna reflector. In its typical application, the telemetry environment simulator accepts signals that indicate the current pointing position of the pedestal, the status of any RF equipment it may have (i.e., antenna or amplifier selection in the case where there is a plurality of such equipment), as well as a set of signals called scan reference signals, that indicate the instantaneous scanned position of an antenna beam with respect to the nominal pointing angle of the antenna. In response to receiving these three kinds of signals, the TES generates an amplitude modulation (AM) signal and an automatic gain control (AGC) signal. The AGC signal is generated by averaging the AM signal over a predetermined time period. The AM signal and the AGC signal are then input to the antenna control unit where the signals are processed and an aiming or pointing signal is generated for aiming the antenna.

The telemetry environment simulator (TES) includes a control computer which contains a central processing unit, volatile memory (i.e., RAM), non-volatile memory (i.e., disk drives) and support components (i.e., power supply, video screen, keyboard and a screen pointing device such as a mouse). The control computer has an information exchange medium, called a "bus" through which it has the ability to control other electronic equipment that is attached to the bus by using pre-determined electronic signal protocols. An audio-visual user interface function may also be provided by this control computer while it is performing the electronic functions required by the TES mission.

The telemetry environment simulator (TES) may also include the following components compatible with the bus protocol:

a) a pedestal interface board designed to convert antenna pointing signals and RF equipment status signals to a form that can be consumed by a control computer as required; and b) a multi-channel D/A converter designed to convert control computer output to an analog form for consumption by an antenna control unit (ACU) as required. The signals that will normally be processed through this board will be the amplitude modulation (AM) and automatic gain control (AGC) signals, and in some situations, the scan reference signals, when these are not available from the antenna feed. The D/A converter will also be used to convert signals that may be generated for specific application requirements where the TES is used.

Analog and digital signal buffering electronics designed to protect the critical TES equipment from anomalous behavior in the interconnections between the ACU, the pedestal and the TES may be included in the interface circuitry described above.

As part of this embodiment, the telemetry environment simulator may include a pedestal interface board for receipt of the pedestal pointing angle signal. The pedestal interface board converts the pedestal pointing angle signal to a computer readable form and inputs the pedestal pointing angle signal to a control computer. The pedestal pointing angle signal is also input to the antenna control unit. Additionally, a pedestal interface board for receipt of the RF control signal may be included. The pedestal interface board converts the RF control signal to a computer readable form and inputs the RF control signal to a control computer. The RF control signal is also input to the antenna pedestal.

Further, this embodiment may include a multi-channel D/A converter for receipt of a scan reference signal. The multi-channel D/A converter converts the scan reference signal from analog to digital and inputs the scan reference signal to the control computer. The scan reference signal is also input to the antenna feed. Additionally, the multi-channel D/A converter for receipt of the amplitude modulation signal generated by a control computer may be included. The multi-channel D/A converter converts the amplitude modulation signal from digital to analog and inputs the amplitude modulation signal to the antenna control unit.

Another embodiment includes a multi-channel D/A converter for receipt of the automatic gain control signal generated by a control computer. The multi-channel D/A converter converts the automatic gain control signal from digital to analog and inputs the automatic gain control signal to the antenna control unit.

An alternative embodiment includes a control computer having a memory, a user interface, a central processing unit, and a bus coupled to a pedestal interface board and a multi-channel D/A converter. The control computer generates the amplitude modulation signal in response to the RF control signal, the pedestal pointing angle signal, and the scan reference signal.

Another embodiment of the telemetry environment simulator is intended to test the ACU and pedestal as in the previous embodiment, but includes the operation of all the RF equipment in the RF signal reception chain. This embodiment provides RF signals in the vicinity of the antenna and does not directly provide AM or AGC signals to the antenna control unit. This alternate embodiment of the TES also includes the control computer, the pedestal interface board, the multi-channel D/A converter and the appropriate signal buffering as in the embodiment described above.

Additionally, this embodiment of the TES contains the following:

a) an RF signal generator capable of providing an RF signal source of stability commensurate with the requirements of the telemetry receiver in use;

b) an electronic RF signal modulator capable of varying the RF signal intensity proportional to an analog signal presented at the input terminals of the modulator; and c) an RF injection point in the receiver chain (The injection point can take the form of a small test probe antenna attached to the main antenna.).

In this embodiment, the AM and AGC signals that emanated from the TES and were provided to the ACU are replaced with a composite RF modulation control signal which emanates from one of the channels of the multi-channel D/A converter. This signal is provided to the modulator mentioned above and is used to modulate the intensity of an RF signal emanating from the RF source described above, and presented at the RF signal injection point described above.

The telemetry environment simulator method comprises generating an RF control signal by the antenna control unit and inputting the RF control signal to the pedestal for selection of an operational antenna in response thereto. The antenna pedestal then generates a pedestal pointing angle signal which is input to the telemetry environment simulator. A scan reference signal is generated and is input to the TES. An AM signal is then generated by the telemetry environment simulator in response to the RF control signal, the pedestal pointing angle signal, and the scan reference signal. An automatic gain control signal can then be generated by the telemetry environment simulator by averaging the amplitude modulation signal over a predetermined time period. The amplitude modulation signal and the automatic gain control signal are then input to the antenna control unit. The antenna control unit then processes the amplitude modulation signal and the automatic gain control signal and generates an aiming signal to aim the operational antenna in response thereto.

Another embodiment of the telemetry environment simulator method further comprises the TES generating signal effects such as fading and multi-path and combining the signal effects with the amplitude modulation signal before the amplitude modulation signal is input to the antenna control unit. A further embodiment may include recording the RF control signal, the pedestal pointing angle signal, the scan reference signal, the amplitude modulation signal, and the automatic gain control signal in the computer's memory device, and analyzing the recorded signals at a later time. Adjustments could then be made to the antenna control unit in response to the errors in the aiming signal.

The telemetry environment simulator method includes generating an RF control signal, a pedestal pointing angle signal, and a scan reference signal. In response to the three signals, an amplitude modulation signal is generated by the telemetry environment simulator. The amplitude modulation signal is input to a modulator. The modulator also receives a radio frequency signal generated by a radio frequency signal generator. The radio frequency signal is modulated with the amplitude modulation signal to create a modulated signal. The modulated signal is input to a probe antenna and transmitted to the antenna feed. The modulated radio frequency signal is received by the antenna feed and input to a receiver. The modulated signal is down converted and input to the antenna control unit. An automatic gain control signal is generated by the receiver and input to the antenna control unit. The antenna control unit processes the amplitude modulation signal and the automatic gain control signal and generates an aiming signal to aim the operational antenna in response thereto.

The TES method comprises generating a target position and signal and noise intensities designed to stress the performance capabilities of the ACU-pedestal-antenna system that is being tested or evaluated. These trajectories may vary in complexity from the benign, represented by stationary positions in space without noise components . . . to extreme scenarios designed to test pedestal velocity performance . . . or scenarios designed to stress the tracking loop performance of the ACU and include effects such as noise and signal intensity modulation due to multi-path and other fading phenomena.

In all embodiments of the TES, the pointing angle of the antenna is compared along with the RF state of its components and the exact antenna beam position as indicated by the scan reference signals. In response to these, an amplitude modulation signal is generated by the TES, with commensurate signal intensity. A further embodiment may include recording the antenna position, the target position and the signal to noise ratio of the target in the computer's memory device, and analyzing same at a later time. Adjustments could then be made to the ACU in response to behavioral trends as indicated by the analysis provided by the TES.

A preferred form of the TES, as well as other embodiments, objects, features, and advantages of this invention, will be apparent from the following detailed description of illustrative embodiments thereof, which is to be read in connection with the accompanying drawings.

BRIEF DESCRIPTION OF THE DRAWINGS

FIG. 11 is a graph of an antenna pedestal response in a simulated sea state 5 condition before any adjustments to the antenna control unit.

FIG. 12 is a graph of an antenna pedestal response in a simulated sea state 5 condition showing improved tracking capabilities after adjustments to the antenna control unit.

DETAILED DESCRIPTION OF THE PREFERRED EMBODIMENT

Figure 1:
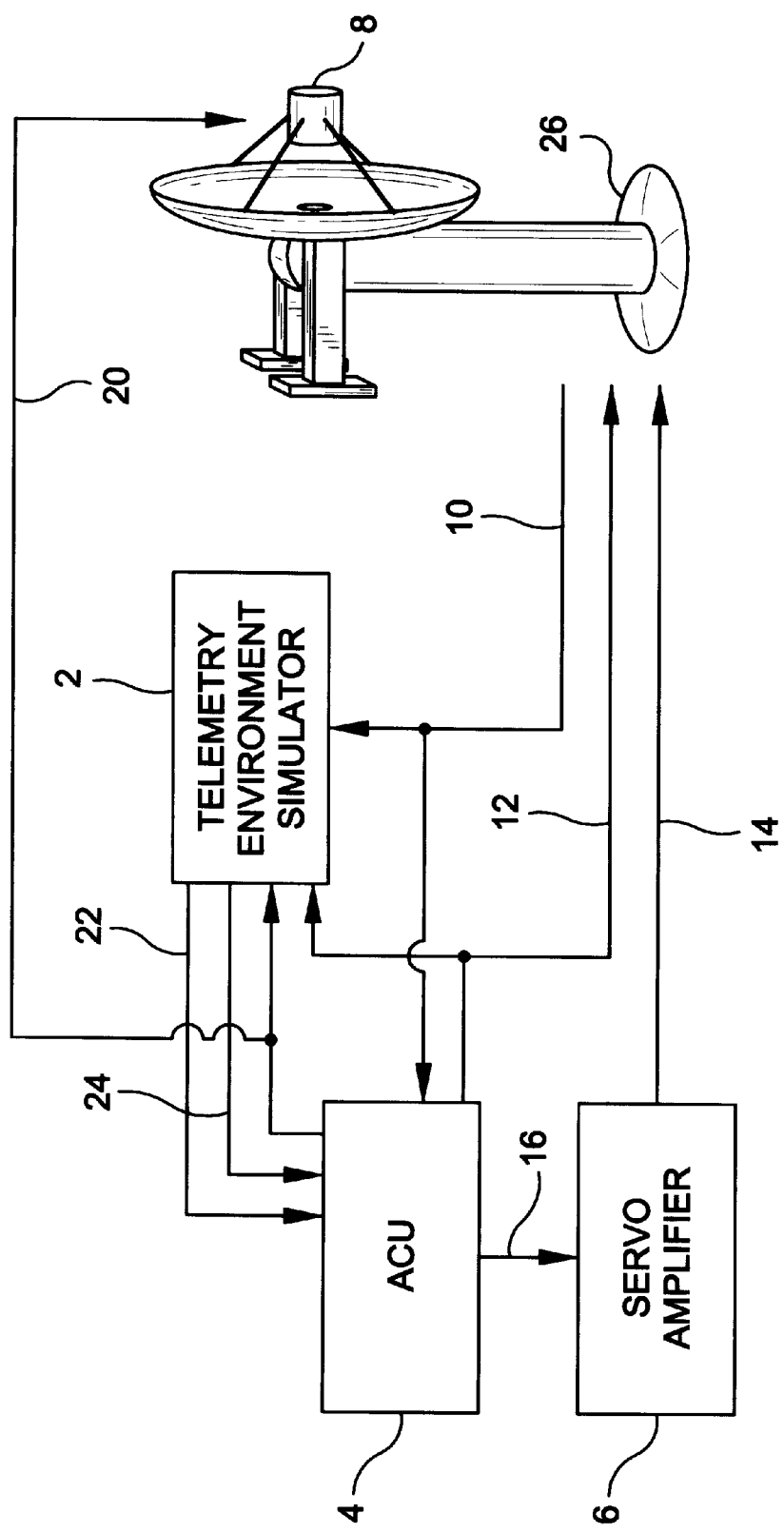
FIG. 1 is a block diagram of an antenna system coupled to a first embodiment of a telemetry environment simulator in which signals are directly input into the ACU.

The present invention is directed to a method and apparatus for testing a telemetry antenna system and is not directed to the telemetry antenna system itself. It is, however, important to the understanding of the present invention to understand the operation of current telemetry antenna systems. Telemetry involves three separate functions: (1) remote generation of a signal which is suitable for transmission; (2) reception of the signal at a locate site; and (3) conversion of the signal to a usable form at the local site. The present invention deals with the second function, i.e., reception of the signal at a local site. The signal is usually transmitted between two points through the atmosphere. If the transmission and reception points are stationary, a receiving antenna is placed pointing directly at the transmission antenna, and adjustments to the antenna pointing position are rarely necessary. If, however, the transmission point is moving with respect to the reception point, the reception antenna must be able to move so as to continuously point directly at the transmission antenna. Antenna control units are employed to continuously keep the reception antenna aligned to the correct orientation.

The alignment function is performed by incrementally scanning the receiving beam around the current transmission antenna's relative angular position and correlating the instantaneous signal intensity, as reflected by the AM signal, with the exact position of the scanned beam. When the transmitting antenna is exactly centered in the center of the beam scan path, the intensity at each scanned position remains constant. As the transmission antenna position deviates from the center, the signal intensity in one portion of the path is different from that in another. Consequently, an error signal is developed in the ACU for each axis by multiplying the signal intensity by the scan reference signals which are indicative of the exact position of the scanned beam.

Current antenna control units used to track targets (i.e., move the receiving antenna so it is continuously pointing at the transmitter) are very sophisticated and often require extensive field testing and significant modifications before reaching an acceptable level of performance. Field testing is extremely expensive and burdensome since it often requires sophisticated cooperative mobile targets that are airborne or seaborne.

The present invention allows antenna control units to undergo extensive testing and fine tuning without the conventional expense and burden by creating a virtual environment in which the antenna control unit is tested. The operational details of the telemetry environment simulator (TES) are straightforward. The tracking control functions of a telemetry antenna system rely on a handful of input signals. These input signals include an antenna modulation signal (AM) and an automatic gain control signal (AGC). The AM signal is an indication of the instantaneous signal amplitude received by the receiving antenna. An antenna beam is an area of space upon which an antenna dish is focused. A typically shaped antenna dish has a feed positioned at the focal point of the dish. The feed receives signals reflected from the antenna dish. The feed is arranged so that the antenna beam position scans a fraction of a beam width. Commonly employed beam scan techniques change the effective feed position as visible to the dish consequently scanning the beam position in space.

Figure 8:
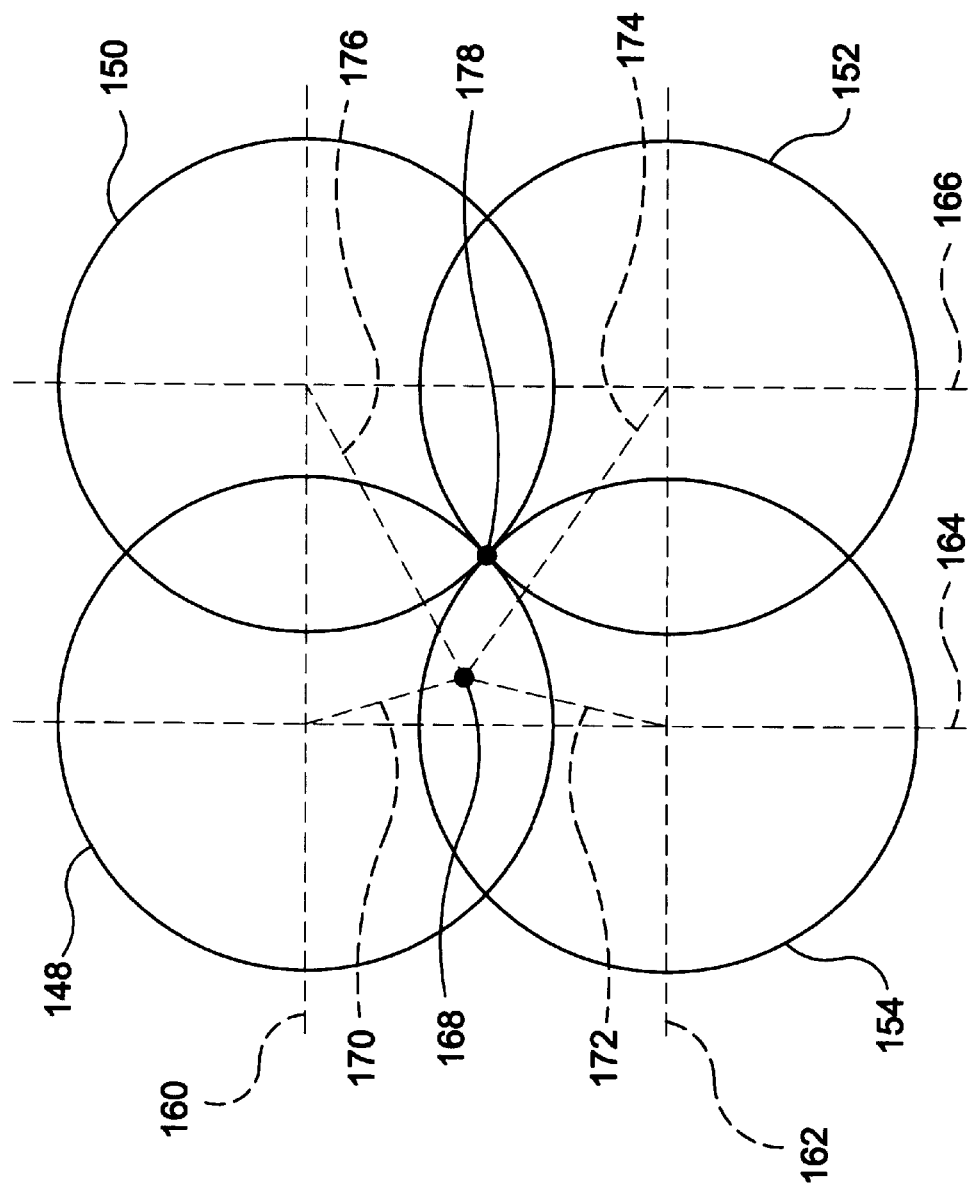
FIG. 8 is a diagram illustrating different antenna beam positions corresponding to different antenna feed positions.

Referring to FIG. 8, the four circles represent instantaneous beam positions 148, 150, 152, and 154 of the antenna. In this figure, the beam scanning profile represents electronic scanning, where the antenna beam is always pointed in one of the four positions. The transmitting antenna position 168 is a different distance from the center of each of the receive beam positions. Consequently, the instantaneous RF signal amplitude available at each beam position is different from that available at any of the others. By sequencing through the beam positions in a repeated fashion, a time series of amplitudes comprising the AM signal is formed. These amplitudes continuously vary as the transmission antenna position moves with respect to the reception antenna's pointing angle. A file of antenna pattern values is contained in TES memory files.

The center of the four circles in FIG. 8 represents the anticipated position of the target. The distance from the center of the respective instantaneous beam positions to the target is illustrated by dashed lines 170, 172, 174, and 176. In FIG. 8 the target is placed within the intersection of beam positions 148 and 154 and beyond beam positions 150 and 152. The result is a signal with an amplitude illustrated by the graph in FIG. 9.

Figure 9:
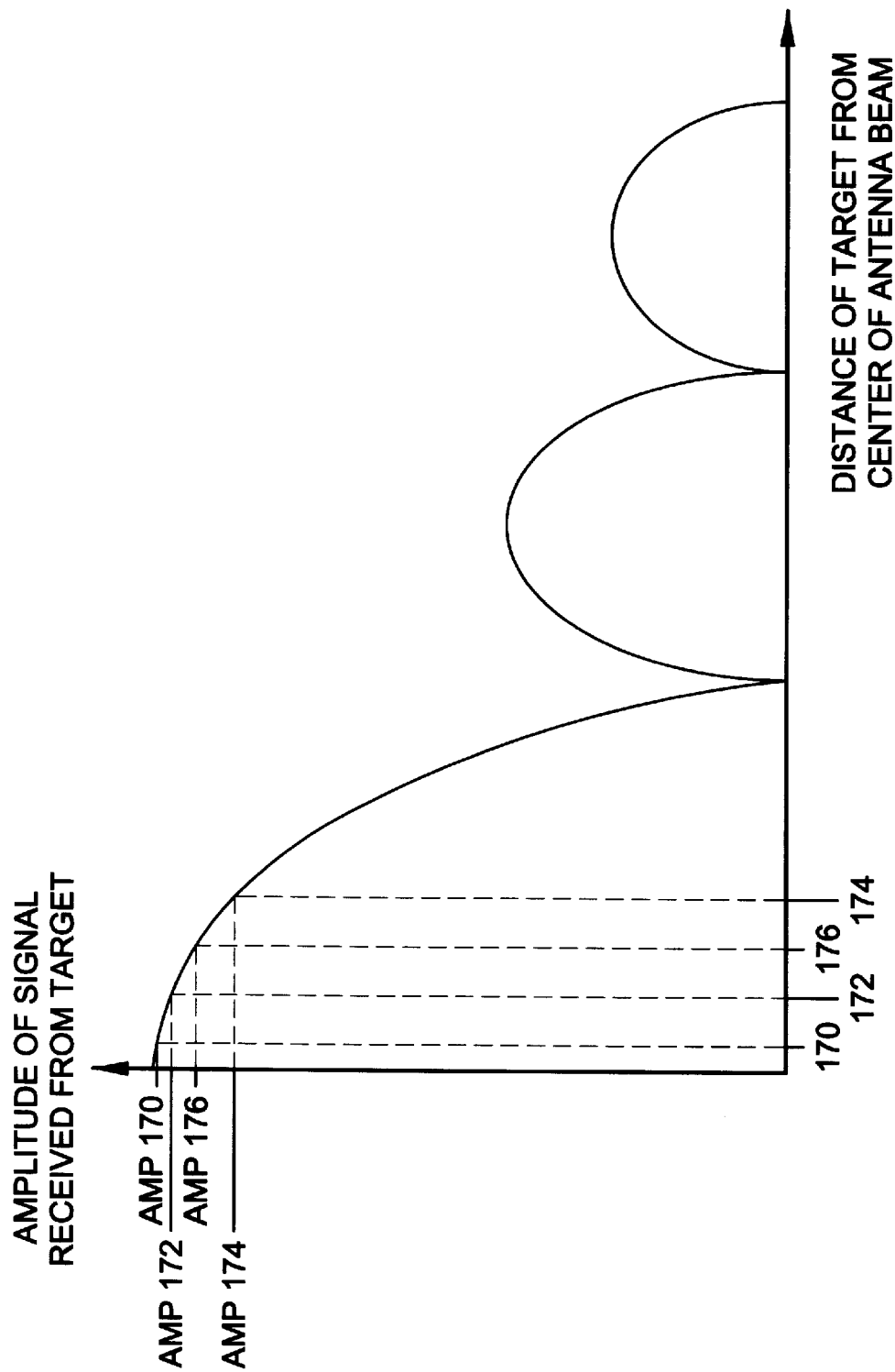
FIG. 9 is a diagram illustrating an amplitude modulation signal's amplitude corresponding to the antenna beam positions illustrated in FIG. 8.

FIG. 9 illustrates the amplitude of the signal received by the antenna. Since, in the example in FIG. 8, the distance represented by dashed line 170 in beam position 148 is the shortest, the amplitude of the signal received by beam position 148 will be the greatest. The amplitudes of the signals in FIG. 9 are arranged by beam position in descending amplitude order. The amplitude of the signal from beam position 154 is second, since the distance from the center of the beam position 154 to the target is the second least.

Figure 10:
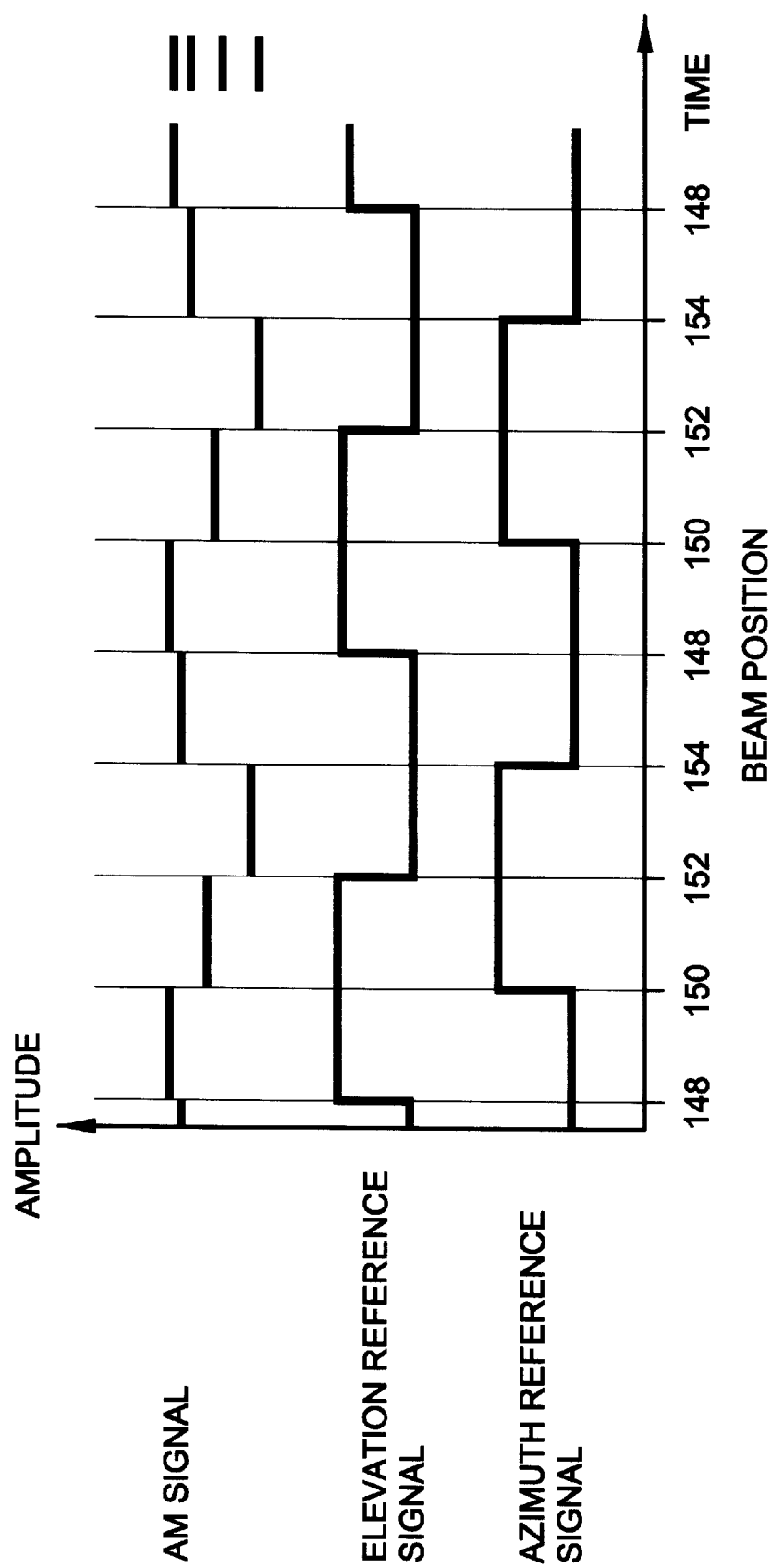
FIG. 10 is a diagram illustrating the sequential forms of the amplitude modulation signal, an elevation signal, and an azimuth signal corresponding to the antenna beam positions illustrated in FIG. 8.

When the beams are sequenced as described, the result is the AM signal illustrated in FIG. 10. As shown in FIG. 9, the signal obtained while in the beam position 148 has the greatest amplitude. The other beam positions will be in decreasing amplitude order. The signals of FIG. 10 can be directly input into the ACU for testing purposes. The ACU will process the signals as if received from a real transmitter in space, and will move the antenna position so as to keep the antenna pointed at the target.

Each one of the beam positions in FIG. 8 is also assigned an elevation value and an azimuth value. An elevation value describes the angular distance of a target above the horizon. An azimuth value describes the angular distance of a target from a center point measured on a horizon circle. The elevation and azimuth values are used to describe the exact position of the antenna beam. Using the antenna pointing information available from the pedestal, through the pedestal interface board, and properly adding the incremental scan positions as indicated by the scan reference signals, the exact position of the beam can be computed for each scanned beam position. This information is used to compute the angular distance between the current beam position and the target, and this distance is imposed on the antenna pattern as described above.

Since in FIG. 8, beam positions 148 and 150 are at the same elevation, they will be assigned the same value. Likewise, beam positions 152 and 154 will be assigned the same elevation value. The elevation values can then be represented by a digital signal toggling between the value assigned to the beam position 148, 150 and the value assigned to beam position 152, 154 depending on which instantaneous beam position is being represented. The signal is illustrated in FIG. 10 and is called the elevation reference signal.

The azimuth value is similarly assigned. Beam positions 148 and 154 are assigned the same azimuth value and beam positions 150 and 152 are assigned the same azimuth value for the example in FIG. 8. The signals can then be represented in a digital signal which toggles between the two values depending on which instantaneous beam position is being represented.

If the elevation value for beam position 148, 150 is 1 and for beam position 152, 154 is 0, and the azimuth value for beam position 148, 154 is 0 and for beam position 150, 152 is 1, the instantaneous beam position of the antenna can be represented by the elevation and azimuth values in the chart below.

| Beam Position | Elevation | Azimuth |
|---|---|---|
| 148 | 1 | 0 |
| 150 | 1 | 1 |
| 152 | 0 | 1 |
| 154 | 0 | 0 |

Referring now to FIG. 10, the elevation and azimuth reference signals are illustrated with respect to the instantaneous beam position of the antenna. As is shown, in beam position 148, the elevation/azimuth signal is 1,0. In beam position 150, it is 1,1. In beam position 152 and 154 it is 0,1 and 1,0, respectively.

The TES allows the user to arrange the scan sequence and beam positions with respect to the scan reference signals since not all antenna feeds have the beam scan sequence or the relative beam positions described in the example above.

The AM signal is averaged over a predetermined time period and the AGC signal is generated. The AGC signal is then input to the ACU. The ACU processes the AM and AGC signals as if they had been received by a local antenna from a remotely located transmitter. The ACU then generates the aiming signal to re-orient the local antenna to a position centered on the target.

Before tracking a target, however, the antenna control system must acquire the target. An antenna system will often employ an acquisition aid antenna to assist in the initial acquisition of the target. The TES may also simulate a system in which an acquisition aid antenna is used to receive target signals when the target is beyond the pointing angle of the main antenna. The signal indicating whether the acquisition aid antenna was selected is included in the group of RF equipment control signals provided to the TES from the pedestal. The antenna pattern for the acquisition aid antenna would cooperate with the antenna pattern for the telemetry antenna and the effects of the acquisition aid antenna would then be included in any processes used by the TES to determine output signals using the same principles described above for the main antenna.

Figure 2:
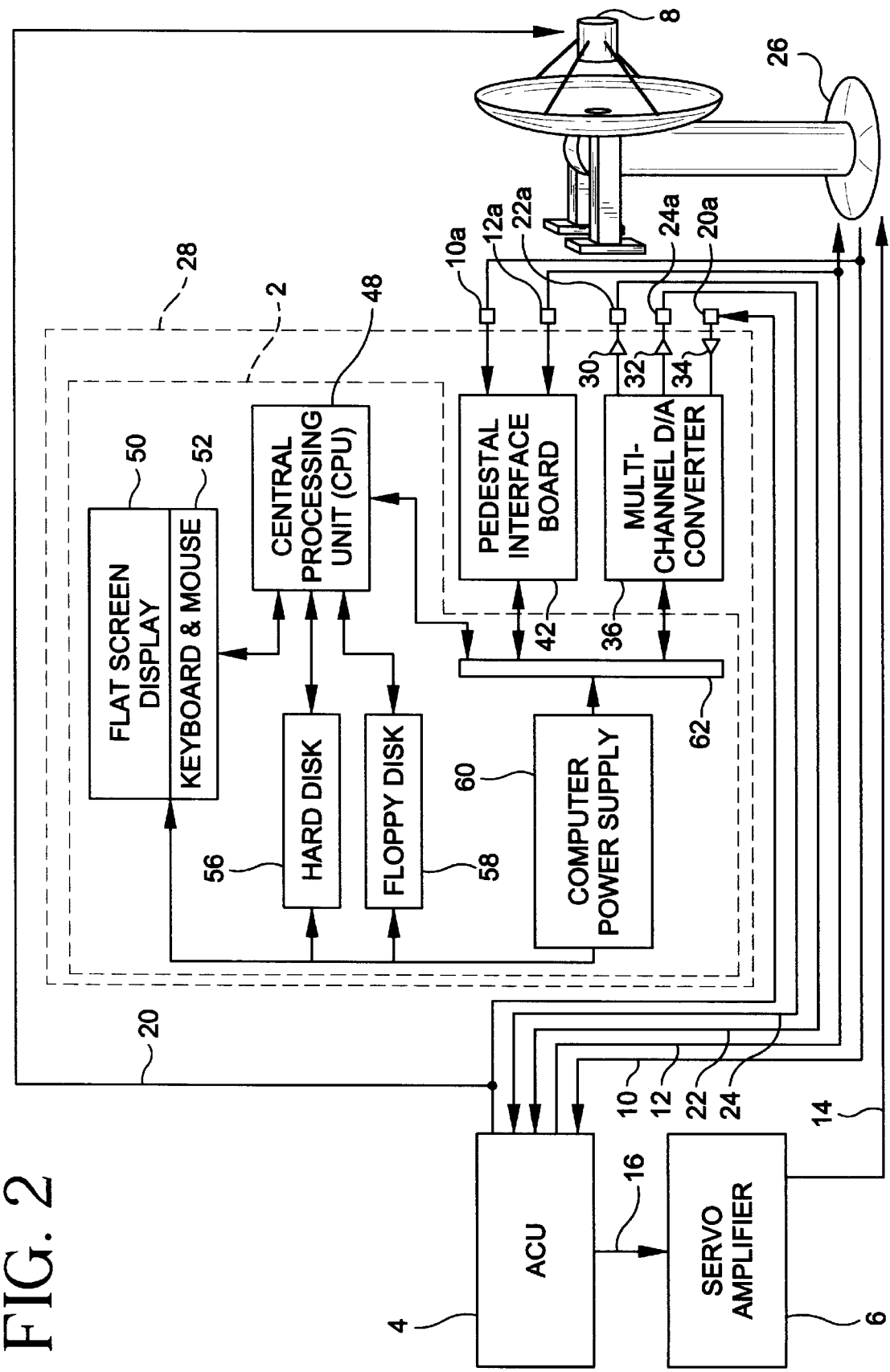
FIG. 2 is a block diagram of the telemetry environment simulator formed in accordance with the first embodiment of the present invention.
Figure 3:
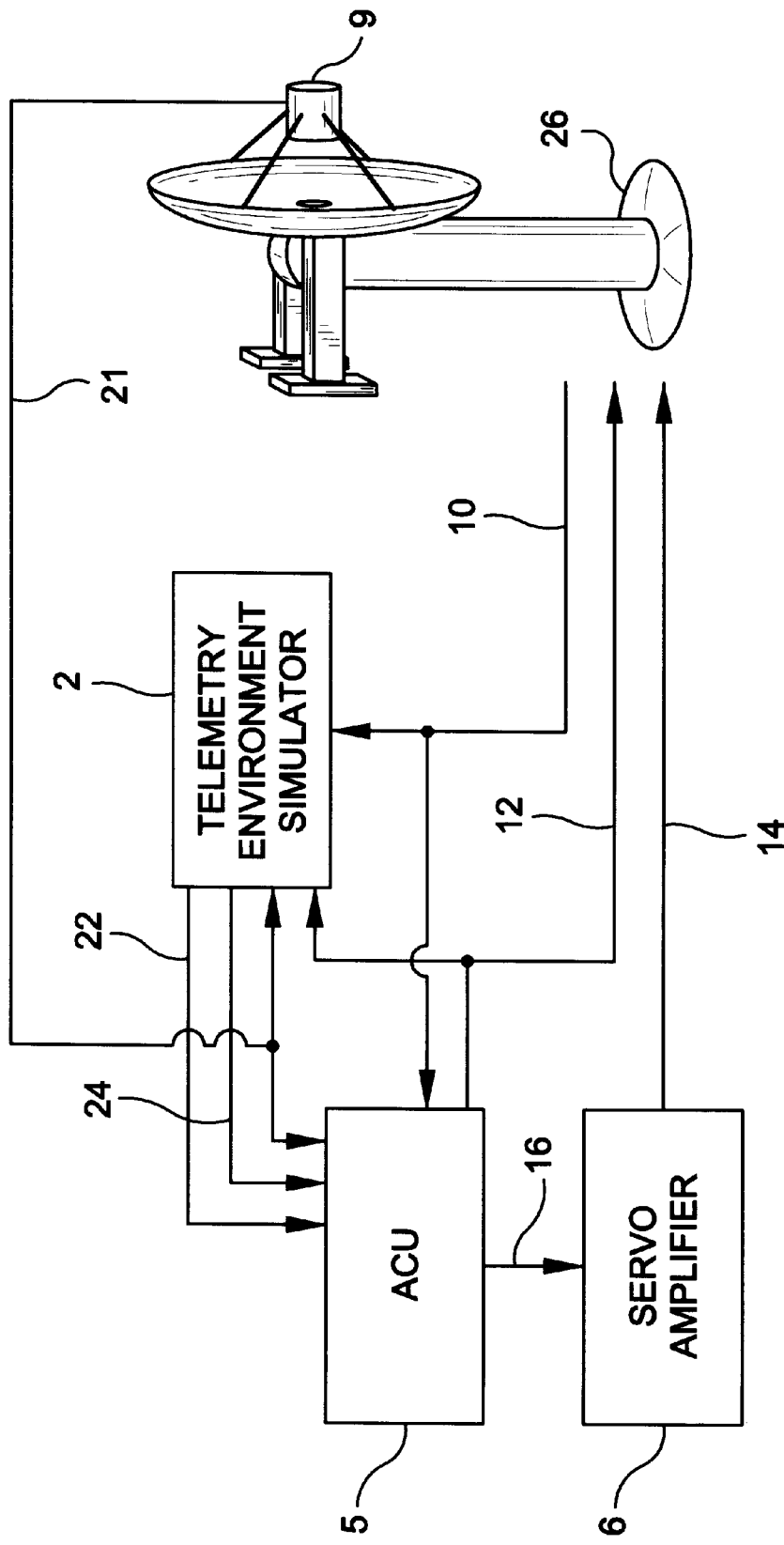
FIG. 3 is a block diagram of an antenna system coupled to a second embodiment of a telemetry environment simulator in which signals are directly input into the ACU.

The TES can operate in two distinct modes. In a first mode, the video mode, the signals which are generated and provided to the ACU are in analog form and are input directly into the ACU from the TES. Block diagrams of embodiments of the video mode are illustrated in FIGS. 1, 2, and 3. In a second mode, the RF mode, the TES modulates an RF signal set at the operating frequency of the antenna.

Figure 4:
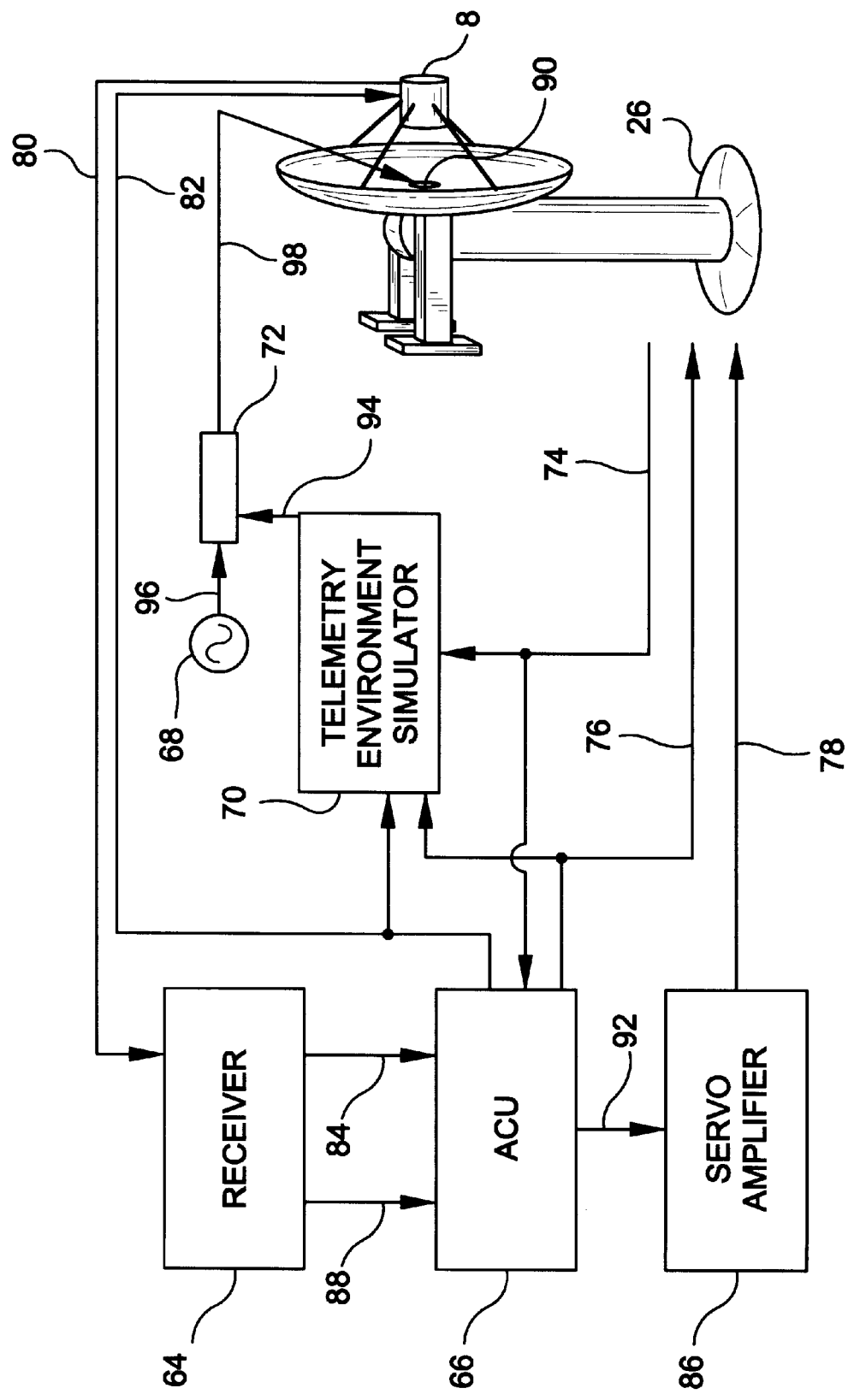
FIG. 4 is a block diagram of an antenna system coupled to a third embodiment of a telemetry environment simulator in which RF signals are received by the antenna.
Figure 5:
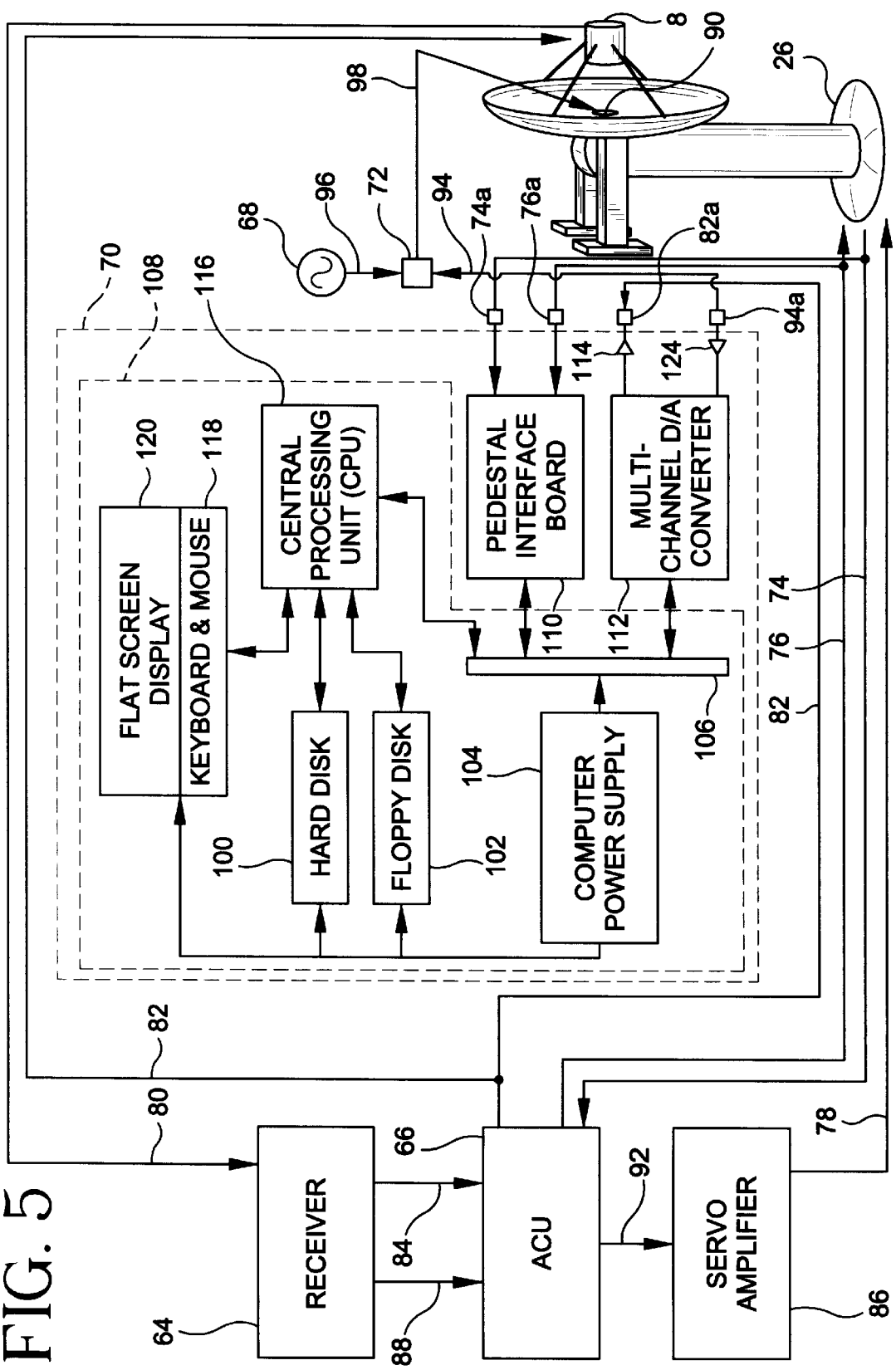
FIG. 5 is a block diagram of the telemetry environment simulator formed in accordance with the third embodiment of the present invention.
Figure 6:
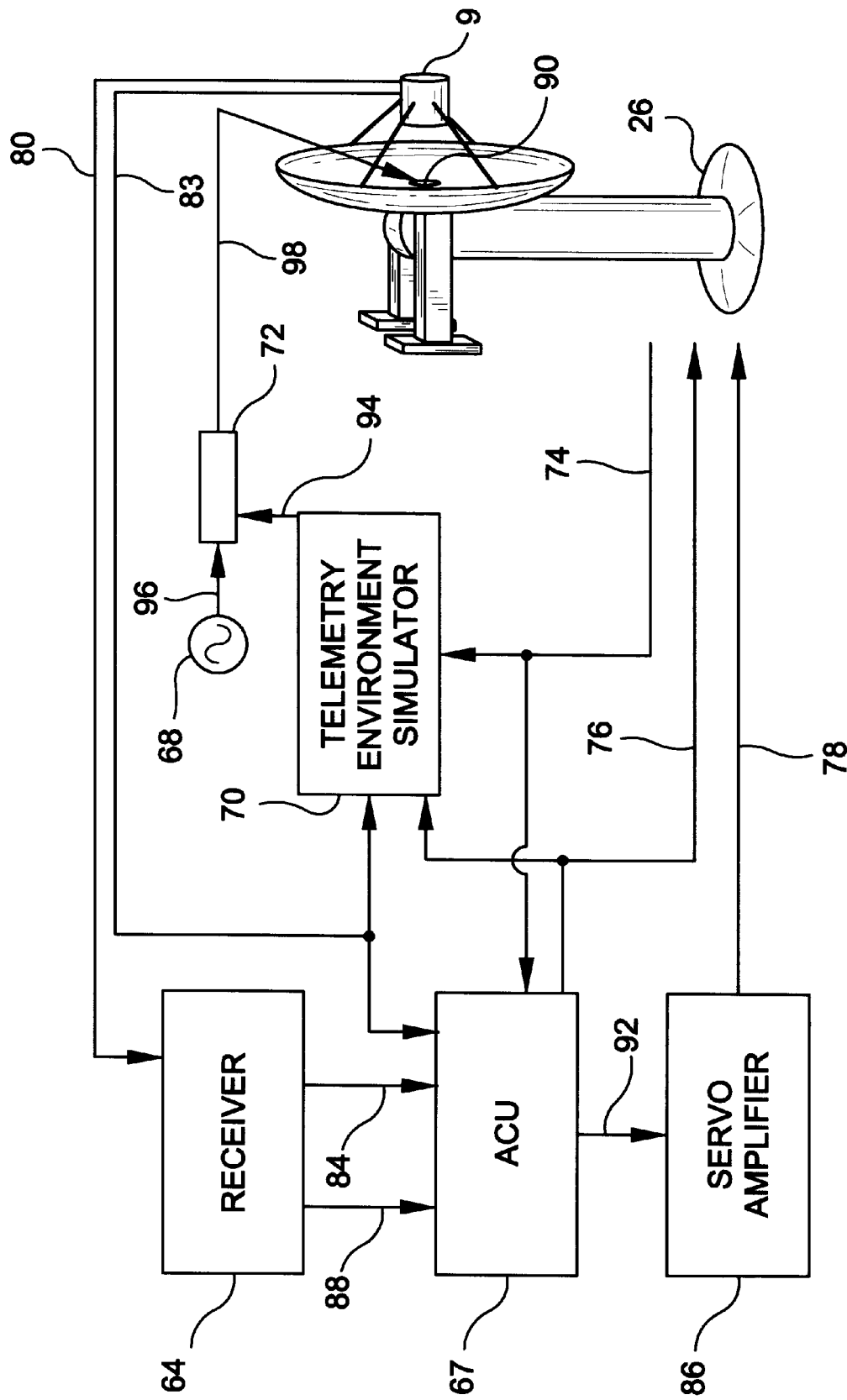
FIG. 6 is a block diagram of an antenna system coupled to a fourth embodiment of a telemetry environment simulator in which RF signals are received by the antenna.

The modulated signal containing the AM data is transmitted from a small probe antenna which may be located in the shadow of the antenna feed. The modulated signal is then processed as if the telemetry antenna system was in operational use. Block diagrams of embodiments of the RF mode are illustrated in FIGS. 4, 5, and 6.

In the preferred embodiments of both the video mode and the RF mode, the scan reference signals are generated by the ACU and input to the TES and antenna feed. In an alternative embodiment, however, the scan reference signals are generated by the antenna feed and are input to the ACU and TES. In another alternative embodiment, the scan reference signals are generated by the TES and are input to the ACU and the antenna feed.

Referring now to FIGS. 1 and 2, the operation of the TES in a first embodiment of the video mode will be described in detail. The TES 2 is arranged to be modular and can be easily plugged into a telemetry antenna system which is to be tested. The TES 2 has an I/O port 22a for transmission of an AM signal 22 to the ACU; an I/O port 24a for transmission of an AGC signal 24 to the ACU; an I/O port 20a for receipt of a scan reference signal 20 from the ACU; and I/O port 12a for receipt of an RF control signal 12 from the ACU; and an I/O port 12a for receipt of a pedestal pointing angle signal 10 from an antenna pedestal.

FIG. 2 is a block diagram of the same circuit as FIG. 1 with the components of the TES 2 shown in greater detail. The TES 2 includes a control computer 28, pedestal interface board 42, multi-channel D/A converter 36, and buffers 30, 32, 34. The control computer 28 includes a display 50, a keyboard 52, a hard drive 56, a floppy disk drive 58, a CPU 48, a power supply 60, and an address and data bus 62.

In this first embodiment, the scan reference signal 20 is generated by the ACU under test. The scan reference signal 20 controls the feed 8 of antenna 26, hence incrementally scanning the antenna beam. The scan reference signal 20 typically consists of two parts, an elevation value and an azimuth value. This signal is provided to the feed 8 to control the feed 8 and is also input to the TES 2 so the TES 2 can determine the position of the antenna beam at a particular instant of time.

In operation, the ACU 4 generates an RF control signal 12 and inputs the signal to the TES 2 and antenna pedestal. Typical antenna systems can have two or three antennas. Only one of the antennas is operational at any given instant in time. The antenna pedestal controls which one of the two or three antennas will be operational in response to the RF control signal. The RF control signal 12 is input to the pedestal interface board 42. The pedestal interface board converts the RF control signal into a form understood by the computer 28 and inputs the converted signal to the bus 62 of the computer 28. The antenna position is communicated to the ACU 4 and the TES 2 by pedestal pointing angle signal 10. The pedestal pointing angle signal 10 is input to the pedestal interface board 42. The pedestal interface board 42 converts the signal 10 into digital form and places the converted signal on the bus 62 of the CPU 48. The scan reference signal 20 generated by the ACU 4 is input to a buffer 34. The buffer 34 conditions the scan reference signal 20 and selects the appropriate data source on the multi-channel D/A converter 36.

Once the CPU 48 receives the RF control signal 12, pedestal pointing angle signal 10, and scan reference signal 20, it accesses the antenna patterns in memory in the hard drive 56 or floppy disk drive 58 to determine the amplitude of the signal that would be received by the antenna in a real world situation under these same conditions. The instantaneous amplitude represents the AM signal. Once this is determined, the CPU 48 can calculate the average strength signal (AGC) of the AM signal over a chosen time period. The CPU 48 then applies the AM and AGC signals through the bus 62 to the multi-channel D/A converter 36 which converts these signals to their analog equivalent AM signal 22 and AGC signal 24 and inputs the signals to buffers 30, 32. The buffers 30, 32 input the AM and AGC signals to the ACU 4. The ACU 4 can now process the signals to determine the aiming signal 16 which is applied to a servo amplifier 6. The servo amplifier 6 amplifies the aiming signal 16 and generates the steering commands 14.

The steering commands 14 are then input to an antenna motor to move the antenna 26.

In a second embodiment of the video mode of the TES, the scan reference signal is generated by the feed 9. A block diagram of the second embodiment is illustrated in FIG. 3. FIG. 3 illustrates a circuit very similar to the circuit illustrated in FIG. 1. The only difference is that the ACU 5 receives the scan reference signal 21 from the feed 9 instead of generating the signal itself. The operation of the TES is the same as in FIG. 1. The scan reference signal 21 is input from the feed 9 to the TES 2 instead of from the ACU 5.

Referring now to FIG. 4 and FIG. 5, a third embodiment of the present invention will be described in detail. The third embodiment operates in the RF mode (i.e., an AM signal generated by the TES modulates an RF signal and the modulated signal is received and processed as a real world signal). The TES 70 is arranged to be modular and can be easily plugged into a telemetry antenna system which is to be tested. The TES 70 has an I/O port 82a for receipt of a scan reference signal 82 generated by the ACU 66; an I/O port 94a for transmission of the AM signal 94 to a modulator 72; an I/O port 76a for receipt of an RF control signal 76 generated by the ACU 66; and an I/O port 74a for receipt of a pedestal pointing angle signal 74 generated from an antenna pedestal.

As in the first embodiment, the scan reference signal 82 controls the beam position of antenna 26. The third embodiment differs, however, in that it includes an RF source 68, a modulator 72, and a receiver 64. The RF source 68 generates a signal at the operating frequency of the antenna under test. This is typically between about 2.2 GHz and about 2.4 GHz, but can be whatever is the operating frequency of the antenna. An RF signal 96 is input from the RF source 68 to a modulator 72. The modulator also receives an AM signal 94 generated by the TES 70. The AM signal 94 reflects the signal amplitude that would result from a simulated target whose path is stored as a file in hard drive 100 or floppy disk drive 102. The modulator 72 modulates the RF signal 96 with the AM signal 94 and inputs the modulated RF signal 98 to a small probe antenna 90 placed in view of the feed 8 of antenna 26. The modulated RF signal 98 is transmitted from the probe antenna 90 and is received by feed 8. The modulated RF signal is then input to a receiver 64. The receiver 64 down converts the modulated RF signal 98 revealing the AM signal 94. The receiver then generates the AGC signal by averaging the AM signal 94 over a chosen time constant. The AM signal is input to the ACU 66 via line 84 and the AGC signal is input to the ACU 66 via line 88.

In operation, the ACU 66 generates an RF control signal 76 selecting the operational antenna from the antenna system. The RF control signal 76 is input to the antenna pedestal and the TES 70. In response, the antenna pedestal generates a pedestal pointing angle signal 74 describing the exact position of the operational antenna. The pedestal pointing angle signal 74 is input to the ACU 66 and TES 70. A scan reference signal 82 is then generated by the ACU 66 and input to the feed 8 and TES 70. The scan reference signal controls the beam position of an antenna by changing the position of the feed 8. Once supplied with the RF control signal 76, the pedestal pointing angle signal 74, and the scan reference signal 82, the TES 70 can determine the AM signal 94.

The TES 70 includes a control computer 108, pedestal interface board 110, multi-channel D/A converter 112, and buffers 114, 124. The control computer includes a display 120, a keyboard 118, a hard disk drive 100, a floppy disk drive 102, a central processing unit 116, a power supply 104, and a bus 106. The RF control signal 76 is received by the pedestal interface board 110 in the TES 70. The pedestal interface board 110 converts the RF control signal 76 into a form which can be understood by the control computer 108. The converted RF control signal is input to the bus 106. The pedestal pointing angle signal 74 is received by the pedestal interface board 110 in the TES 70. The pedestal interface board 110 converts the pedestal pointing angle signal 74 to understandable form and inputs the converted signal to bus 106. The scan reference signal 82 is received by the buffer 114 and input to the multi-channel D/A converter 112. The multi-channel D/A converter 112 converts the signal from analog to digital and inputs the signal to bus 106.

Once the TES 70 is supplied with the RF control signal 76, pedestal pointing angle signal 74, and scan reference signal 82, the AM signal can be determined. The bus 106 inputs the RF control signal 76, pedestal pointing angle signal 74, and scan reference signal 82 to the central processing unit 116. The central processing unit scans the hard disk drive or floppy disk drive for the appropriate antenna pattern and reads from the stored antenna patterns what the AM signal would be in a real world situation with the antenna and feed positioned in the same way. The AM signal is then input to the bus 106 and is communicated to the multi-channel D/A converter 112. The multi-channel D/A converter 112 converts the AM signal to analog from digital form and inputs the signal to the buffer 124. The buffer 124 inputs the AM signal 94 to the modulator 72 as discussed earlier. After the AM and AGC signals are supplied to the ACU 66 by the receiver 64, the ACU determines the position of the target and calculates the change in direction of the antenna that is necessary. The change in direction is controlled by an aiming signal 92 generated by the ACU 66 and input to a servo-amplifier 86. The servo-amplifier 86 amplifies the aiming signal and generates a steering command 78. The steering command 78 is then input to the antenna motor for moving the antenna 26. The antenna is then moved to a new position.

In a fourth embodiment also operating in the RF mode and illustrated in FIG. 6, the scan reference signal 83 is generated by the feed 9 instead of the ACU 67. The scan reference signal is input to the ACU 67 and TES 70. The operation of the TES 70 is identical to that of the circuit in FIG. 4.

In operation, the CPU 48 controls the simulation procedure. An antenna pattern is stored in the computer memory hard disk drive 56 or can be on a floppy disk loaded onto the floppy disk drive 58. Preferably, the standard antenna patterns will be on the hard disk drive of the control computer 28 and the user can install customized antenna patterns on the floppy disk drive. The user will select a desired scenario and set antenna patterns and parameters using the control computer's user interface 50, 52. The scenario describes the path of the target and the signal to noise ratio of the target which is computed considering speed and direction of targets, and signal effects including fading and multi-path which are computed based on the terrain and the polarization of the signal.

The target file contains the target position and intensity for each target as a function of time. The data collection features of the TES allow acquisition and lock-on transients or steady state errors of the tracking loop to be accurately measured, and hence exhaustively characterized in a dynamic, repeatable environment. These characteristics can be recorded in a file for later analysis.

Figure 7:
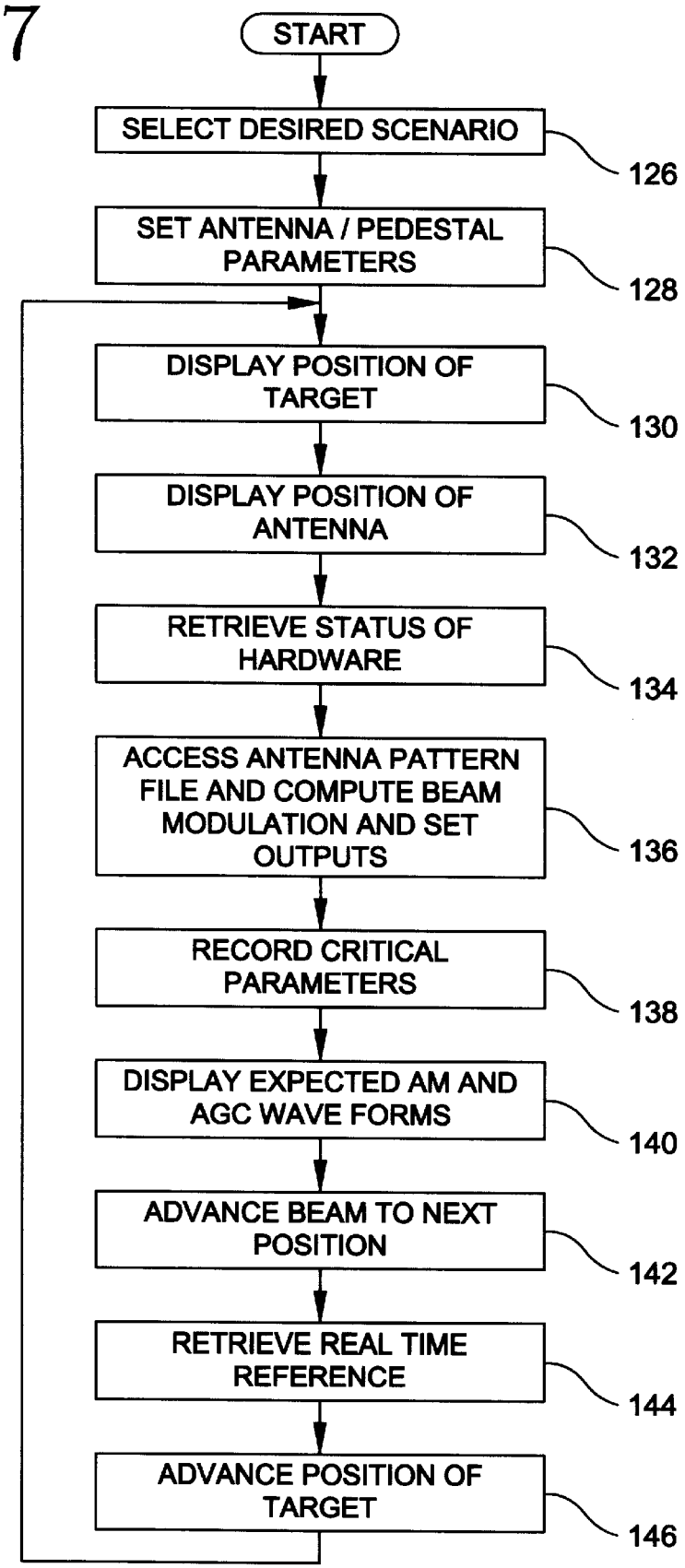
FIG. 7 is a flowchart illustrating the procedure for running the simulation.

Referring now to FIG. 7, the simulation process will be described in detail. The simulation begins by selecting a desired scenario 126. The number and type of targets are chosen, the target trajectories are set, and any signal effects are added. The antenna/pedestal parameters are set 128 by selecting the antenna size, type of feed, and position feedback circuit (e.g., encoder or synchro). The target position is then displayed 130. The antenna position is then displayed 132 and the status of the hardware is retrieved 134. The antenna pattern is then read from a data file and the beam modulation is computed and outputs are set on the multi-channel D/A converter 136. The critical parameters are then recorded 138 to a file in the hard disc drive 26. The expected AM and AGC waveforms are then displayed 140 and the antenna beam position is advanced to the next position 142. A real time reference is retrieved 144 and the target's position is advanced 146 and displayed. The process then begins again at display position of target 130 and continues incrementally until the target has completed the course.

In a preferred embodiment, standard test scenarios would be saved on hard drive 26 and would be chosen by the user. The following test scenarios are an illustrative but not complete list of scenarios which could be run to characterize any antenna/pedestal:

a) The target emulates an RF source at a fixed point in space to verify operation for a stationary target;

b) The target is made to fly around the pedestal at a fixed elevation to test azimuth control;

c) The target's elevation rate is varied but azimuth remains constant to test elevation control;

d) The target's azimuth rate and elevation rate change simultaneously to test cooperation of azimuth and elevation controls;

e) The target's position is purposely dropped below the horizon periodically to simulate a low elevation angle track over water resulting in a multi-path effect;

f) The signal strength is made to move through nulls of increasing duration to simulate a fading effect;

g) The target flies through great circles so that the pedestal lies just outside the plane of the great circle in varying amounts;

h) An airborne target is flown close to the pedestal so that the angular rates of the target exceed the pedestal's capabilities to simulate high performance aircraft;

I) The target is made to go through step, ramp, and impulse response maneuvers that are impossible in the real world to record classical pedestal responses; and j) The target's position oscillates with increasing frequency and bode plot parameters can be recorded to test frequency response.

Once the scenario is chosen, the TES is run with the scenario and the output is analyzed. From an overall system sense, application of the TES becomes a powerful tool. When an expected target path is programmed and the tracking error is measured and plotted over the duration of the trajectory, trends or systematic performance nulls in the pedestal coverage envelope are revealed. Adjustments and modifications can then be made to fine tune the performance of the telemetry antenna system under test.

A test was performed using the telemetry environment simulator. The test simulated sea state 5 dynamics. The sea state 5 motion was simulated for a telemetry antenna system aboard a DDG class ship. FIG. 11 is a graph of ship roll versus time illustrating the tracking loop before it was optimized. The amplitude of the signal received from the actual target is shown by line 180. The amplitude of the signal received by the telemetry antenna when focused on the anticipated position of the target is shown by line 182. The difference between lines 180 and 182 is the tracking loop error and is illustrated by line 184.

The TES is used to simulate the movement of a ship when tracking a moving target. Once the first simulation is run, the antenna system can be fine tuned. The result is illustrated by the graph of ship roll versus time in FIG. 12. The amplitude of the signal received from the actual target and the amplitude of the signal received by the telemetry antenna when focused on the anticipated position of the target fit much more closely after only one adjustment. In fact, the difference between the amplitude of the signal received from the actual target and the amplitude of the signal received by the telemetry antenna when focused on the anticipated position of the target is so small that a single line 186 is used to represent both amplitudes in FIG. 12. The minute error is illustrated by line 188. Line 188 illustrates the error is now only 20% of that illustrated by line 184.

The flexible nature of the TES allows multiple targets to exist simultaneously within the virtual space while interacting with the effects of weather, multi-path, fading, and any other signal contamination or fluctuation that can be characterized.

The advantage of such an approach is that the target trajectory can be made to emulate vehicles of choice ranging from satellites to aircraft to ground vehicles, under varying conditions. In this way, the tracking loop parameters of the telemetry antenna system can be tuned with the dynamics of the antenna, various targets, and natural environment effects.

The TES can also be used to verify a consistent level of performance within a batch or batches of production telemetry antenna systems. Consistency and accuracy of performance is paramount for antenna control systems. Defective or malfunctioning systems could be separated by passing all production through a test stage with the TES.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A virtual environment simulator apparatus for testing an antenna control system, the antenna control system including an antenna control unit electrically coupled to a pedestal and a feed positioned at a focal point of an antenna reflector, the virtual environment simulator apparatus comprising:

means for receiving a pedestal status signal generated by the antenna pedestal, the pedestal status signal also being input to the antenna control unit;

means for receiving an RF control signal generated by the antenna control unit, the RF control signal also being input to the antenna pedestal;

means for receiving a scan reference signal generated by the antenna control unit, the scan reference signal also being input to the antenna feed;

means for generating an amplitude modulation signal in response to the pedestal status signal, the RF control signal, and the scan reference signal; and means for generating an automatic gain control signal by averaging the amplitude modulation signal over a predetermined time period, wherein the amplitude modulation signal and the automatic gain control signal are input to the antenna control unit for aiming the antenna.

2. A virtual environment simulator apparatus as defined by claim 1, wherein the pedestal status signal receiving means comprises:

a first pedestal interface board for receiving the pedestal status signal generated by an antenna pedestal, the first pedestal interface board converting the pedestal status signal to a computer readable form.

3. A virtual environment simulator apparatus as defined by claim 2, wherein the RF control signal receiving means comprises:

a second pedestal interface board for receiving the RF control signal generated by the antenna control unit, the second pedestal interface board converting the RF control signal to a computer readable form.

4. A virtual environment simulator apparatus as defined by claim 3, wherein the scan reference signal receiving means comprises:

a first multi-channel D/A converter for receiving the scan reference signal, the first multi-channel D/A converter converting the scan reference signal from analog to digital, the digital scan reference signal being input to the antenna feed.

5. A virtual environment simulator apparatus as defined by claim 4, further comprising:

a computer for receiving the pedestal status signal, the RF control signal, and the scan reference signal; and a second multi-channel D/A converter for receiving the amplitude modulation signal generated by the computer in response to the received signals, the second multi-channel D/A converter converting the amplitude modulation signal from digital to analog and inputting the digital amplitude modulation signal to the antenna control unit.

6. A virtual environment simulator apparatus as defined by claim 5, further comprising:

a third multi-channel D/A converter for receipt of the automatic gain control signal, the third multi-channel D/A converter converting the automatic gain control signal from digital to analog and inputting the digital automatic gain control signal to the antenna control unit.

7. A virtual environment simulator apparatus as defined by claim 6, wherein the computer comprises:

a memory, a user interface, a central processing unit, and a pc bus coupled to the first pedestal interface board, the second pedestal interface board, the first multi-channel D/A converter, the second multi-channel D/A converter, and the third multi-channel D/A converter, the computer generating the amplitude modulation signal in response to the RF control signal, the pedestal status signal, and the scan reference signal and the automatic gain control signal in response to the amplitude modulation signal.

8. A method of testing an antenna control system using a virtual environment simulator apparatus, the antenna control system including an antenna control unit electrically coupled to an antenna pedestal and a reflector having a feed positioned at the reflector focal point, comprising the steps of:

generating an RF control signal by the antenna control unit, the RF control signal being input to the pedestal for selection of an operational antenna in response thereto;

generating a pedestal status signal by the antenna pedestal, the pedestal status signal identifying a position of the operational antenna;

generating a scan reference signal by one of the virtual environment simulator apparatus, antenna control unit, and feed, the feed of the operational antenna being positioned in response to the scan reference signal;

generating an amplitude modulation signal by the virtual environment simulator apparatus in response to the RF control signal, the pedestal status signal, and the scan reference signal;

generating an automatic gain control signal by the virtual environment simulator apparatus by averaging the amplitude modulation signal over a predetermined time period;

inputting the amplitude modulation signal and the automatic gain control signal to the antenna control unit, wherein the antenna control unit processes the amplitude modulation signal and the automatic gain control signal and generates an aiming signal to aim the operational antenna in response thereto.

9. A method as defined by claim 8 further comprising the steps of:

generating signal effects by the virtual environment simulator apparatus; and combining the signal effects with the amplitude modulation signal prior to the amplitude modulation signal being input to the antenna control unit.

10. A method as defined by claim 8, wherein the virtual environment simulator apparatus includes a computer having a memory device, further comprising the steps of:

recording the RF control signal, the pedestal status signal, the scan reference signal, the amplitude modulation signal, and the automatic gain control signal in the memory device;

analyzing the recorded signals; and adjusting the antenna control unit in response to errors in the aiming signal.

11. A method of testing an antenna control system using a virtual environment simulator apparatus, the antenna control system including an antenna control unit electrically coupled to an antenna pedestal, a reflector having a feed positioned at the reflector focal point, a radio frequency signal generator, a modulator, and a probe antenna positioned substantially within the shadow of the antenna feed on the antenna reflector, comprising the steps of:

generating an RF control signal by the antenna control unit, the RF control signal being input to the pedestal for selection of an operational antenna in response thereto;

generating a pedestal status signal by the antenna pedestal, the pedestal status signal identifying a position of the operational antenna;

generating a scan reference signal by one of the virtual environment simulator apparatus, antenna control unit, and feed, the feed of the operational antenna being positioned in response to the scan reference signal;

generating an amplitude modulation signal by the virtual environment simulator apparatus in response to the RF control signal, the pedestal status signal, and the scan reference signal, the amplitude modulation signal being input to the modulator;

generating a radio frequency signal by the radio frequency signal generator, the radio frequency signal being input to the modulator;

modulating the radio frequency signal with the amplitude modulation signal to create a modulated signal, the modulated signal being input to the probe antenna;

transmitting the modulated signal from the probe antenna;

receiving the modulated radio frequency signal by the antenna feed, the modulated signal being input to a receiver;

down converting the modulated signal by the receiver, the down converted signal being identical to the amplitude modulation signal, the down converted signal being input to the antenna control unit;

generating an automatic gain control signal by the receiver, the automatic gain control signal being an average of the amplitude modulation signal over a predetermined time period, the automatic gain control signal being input to the antenna control unit, wherein the antenna control unit processes the amplitude modulation signal and the automatic gain control signal and generates an aiming signal to aim the operational antenna in response to the automatic gain control signal.

12. A method as defined by claim 11 further comprising the steps of:

generating signal effects by the virtual environment simulator apparatus; and combining the signal effects with the amplitude modulation signal prior to the amplitude modulation signal being input to the antenna control unit.

13. A method as defined by claim 11, wherein the virtual environment simulator apparatus includes a computer having a memory device, further comprising the steps of:

recording the RF control signal, the pedestal status signal, the scan reference signal, the amplitude modulation signal, and the automatic gain control signal in the memory device;

analyzing the recorded signals; and adjusting the antenna control unit in response to errors in the aiming signal.

* * * * *